US009743041B1

(12) United States Patent
Owen et al.

(10) Patent No.: US 9,743,041 B1
(45) Date of Patent: Aug. 22, 2017

(54) ASKME NOW SYSTEM AND METHOD

(71) Applicants: Lawrence J. Owen, Caguas, PR (US); Bienvenido Velez-Rivera, Mayaguez, PR (US)

(72) Inventors: Lawrence J. Owen, Caguas, PR (US); Bienvenido Velez-Rivera, Mayaguez, PR (US)

(*) Notice: Subject to any disclaimer, the term of this patent is extended or adjusted under 35 U.S.C. 154(b) by 0 days.

(21) Appl. No.: 15/002,064

(22) Filed: Jan. 20, 2016

Related U.S. Application Data

(60) Provisional application No. 62/106,642, filed on Jan. 22, 2015, provisional application No. 62/163,513, filed on May 19, 2015.

(51) Int. Cl.
*H04N 7/14* (2006.01)

(52) U.S. Cl.
CPC .................. *H04N 7/147* (2013.01)

(58) Field of Classification Search
CPC ........................................ H04N 7/14
USPC ........ 348/14.01, 14.03, 14.05, 14.08; 379/49
See application file for complete search history.

(56) References Cited

U.S. PATENT DOCUMENTS

| 7,040,541 | B2* | 5/2006 | Swartz | G06K 17/00 235/462.46 |
|---|---|---|---|---|
| 8,666,031 | B2* | 3/2014 | Rowe | H04M 11/04 345/173 |
| 2004/0223054 | A1* | 11/2004 | Rotholtz | G08B 13/19613 348/143 |
| 2005/0162515 | A1* | 7/2005 | Venetianer | G06F 17/3079 348/143 |
| 2007/0138268 | A1* | 6/2007 | Tuchman | G06Q 30/02 235/383 |
| 2010/0026802 | A1* | 2/2010 | Titus | G08B 13/19608 348/143 |
| 2012/0282974 | A1* | 11/2012 | Green | G08B 13/19689 455/550.1 |
| 2014/0038544 | A1* | 2/2014 | Jones | G08B 13/196 455/404.2 |
| 2015/0058142 | A1* | 2/2015 | Lenahan | G06Q 30/0631 705/16 |
| 2016/0255969 | A1* | 9/2016 | High | G06K 9/00791 |
| 2016/0321901 | A1* | 11/2016 | Desoyza | A61B 5/747 |

* cited by examiner

*Primary Examiner* — Olisa Anwah
(74) *Attorney, Agent, or Firm* — Luis Figarella; Morris Pollack

(57) ABSTRACT

A system and method for the interaction between humans which can be implemented using audio and/or video communication initiated by any of the points within a network so that the selection, engagement and interaction between said humans replicates the natural in-person interaction that would occur if the participants were co-located in the same physical space.

8 Claims, 5 Drawing Sheets

ASKME NOW SYSTEM AND METHOD

CROSS-REFERENCE TO RELATED APPLICATIONS

This application claims priority to U.S. Provisional patent application Ser. No. 61/832,913 titled "Tele-presence Customer Engagement Network", filed on Jan. 22, 2015 and "Tele-presence Customer Engagement Network", filed May 19, 2015, the disclosure of both being incorporated herein by reference in their entirety.

PATENTS CITED

The following documents and references are incorporated by reference in their entirety, Levy et al (U.S. Pat. No. 7,949,616), Nguyen et al (U.S. Pat. No. 8,688,147) and Stuart et al (U.S. Pat. No. 8,670,017).

FIELD OF THE INVENTION

The present invention relates to a system and method for the interaction between humans which can be implemented using audio and/or video communication initiated by any of the points within a network so that the selection, engagement and interaction between said humans replicates the natural in-person interaction that would occur if the participants were co-located in the same physical space.

DESCRIPTION OF THE RELATED ART

The explosion in portable communication technology, in cooperation with the increases in bandwidth and accessibility brought by wireless communication has made possible a number of tasks. In the case of video, whereas a decade ago download connection speeds were often 10 times those of upload, recent advances have made possible the interaction between upload/download to be almost one to one. As such, we see applications like PERISCOPE, where anyone can become a video transmitting site.

Similarly, Tele-presence has exploded in recent times, with the enhanced amount of bandwidth and robots making interaction easier. In particular, we see many applications that bring the human remotely into a location, such as surgery, repairs, etc. Teleconference has allowed for the reduction of travel, while maintaining some semblance of human interaction. Special interaction rooms, such as POLYCOM's "Halo Collaboration" rooms allow for an almost seamless interaction.

Similarly, remote concierge services (where a person acting as a Concierge or Security Guard) interacts through video with individuals seeking assistance/entry, have been fielded. Thus, there is no doubt that if two individuals know each other, and/or one of them desires to interact/receive a service/access and/or otherwise interact remotely with a known party, there are many solutions available. These may range from a Smartphone (e.g. Apple's Facetime video from your iPhone), to Halo rooms.

The challenge remains in areas that traditionally mimic the information desk/salesperson duties. That is, areas where an interaction level and moment of occurrence has to be judged, and many times initiated in a manner that is not seen as intrusive, as secret surveillance and/or excessively pesky (any of which may result in the individual's annoyance causing him/her to leave), while at the same time reducing/minimizing the attendant's costs.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a telecommunication system for connecting a local individual with a distant individual, the system comprising one or more local interactive apparatus for use by at least one individual, said interactive apparatus having a video and/or audio component, and being connected to one or more networks capable of continuously transmitting said local interactive apparatus audio and/or video over said networks, one or more remote interactive apparatus for use by at least one service agent, with at least one said remote interactive apparatus being connected to one or more networks, said remote interactive apparatus being capable of receiving and controlling multiple said local interactive apparatus audio and/or video connections over said network, surveillance components for auditing one or more individual's positions and/or actions data, said surveillance components and data being capable of being controlled by one or more of said remote interactive apparatus, wherein said service agent is capable of initiating an interaction with one or more individuals through one or more local interactive apparatus selected by said service agent upon detecting an opportunity or need for productive one-to-one conversation.

In another aspect said local interactive apparatus components include at least one from the list comprised of: kiosk, hand held terminal and/or smartphone app.; and wherein said local interactive apparatus are capable of continuous real-time video and/or audio codec over said network. In yet another aspect said surveillance components include at least one from the list comprised of: video, audio and/or individual's position surveillance components data. In another aspect said individual position data includes data obtained from at least one of; beacons, GPS, smartphone app reports, individual's location (situation, aspect, attitude, mood, etc) derivation from surveillance video and/or audio. In yet another aspect said surveillance components include at least one from the list comprised of: video, audio and/or individual's position surveillance components data. In another aspect said individual position data includes data obtained from at least one of; beacons, GPS, smartphone app reports, individual's location derivation from surveillance video.

In one aspect the invention is about a telecommunication method for connecting a local individual with a distant individual, the method comprising: providing a local interactive apparatus for use by at least one individual, said interactive apparatus having a video and/or audio component, and being connected to one or more networks capable of transmitting said local interactive apparatus continuous real-time audio and/or video over said network; enabling one or more remote interactive apparatus for use by at least one service agent, with at least one said remote interactive apparatus being connected to one or more networks, said remote interactive apparatus being capable of receiving and controlling and/or switching among multiple said local interactive apparatus audio and/or video connections over said network; providing surveillance components for auditing one or more individual's positions and/or actions data, said surveillance components and data being capable of being controlled by one or more of said remote interactive apparatus; wherein said service agent is capable of initiating an interaction with one or more individuals through one or more local interactive apparatus selected by said service agent upon detecting a need or opportunity for a productive one-to-one conversation.

In another aspect said local interactive apparatus components include at least one from the list comprised of: kiosk, hand held terminal and/or smartphone app.; and wherein said local interactive apparatus are capable of video and/or audio codec over said network. In yet another aspect said surveillance components include at least one from the list comprised of: video, audio and/or individual's position surveillance components data. In another aspect said individual position data includes data obtained from at least one of; beacons, GPS, smartphone app reports, individual's location derivation from surveillance video. In yet another aspect said surveillance components include at least one from the list comprised of: video, audio and/or individual's position surveillance components data. In another aspect said individual position data includes data obtained from at least one of; beacons, GPS, smartphone app reports, individual's location derivation from surveillance video.

Other features and advantages of the present invention will become apparent upon examining the following detailed description of an embodiment thereof, taken in conjunction with the attached drawings.

Figure 1:
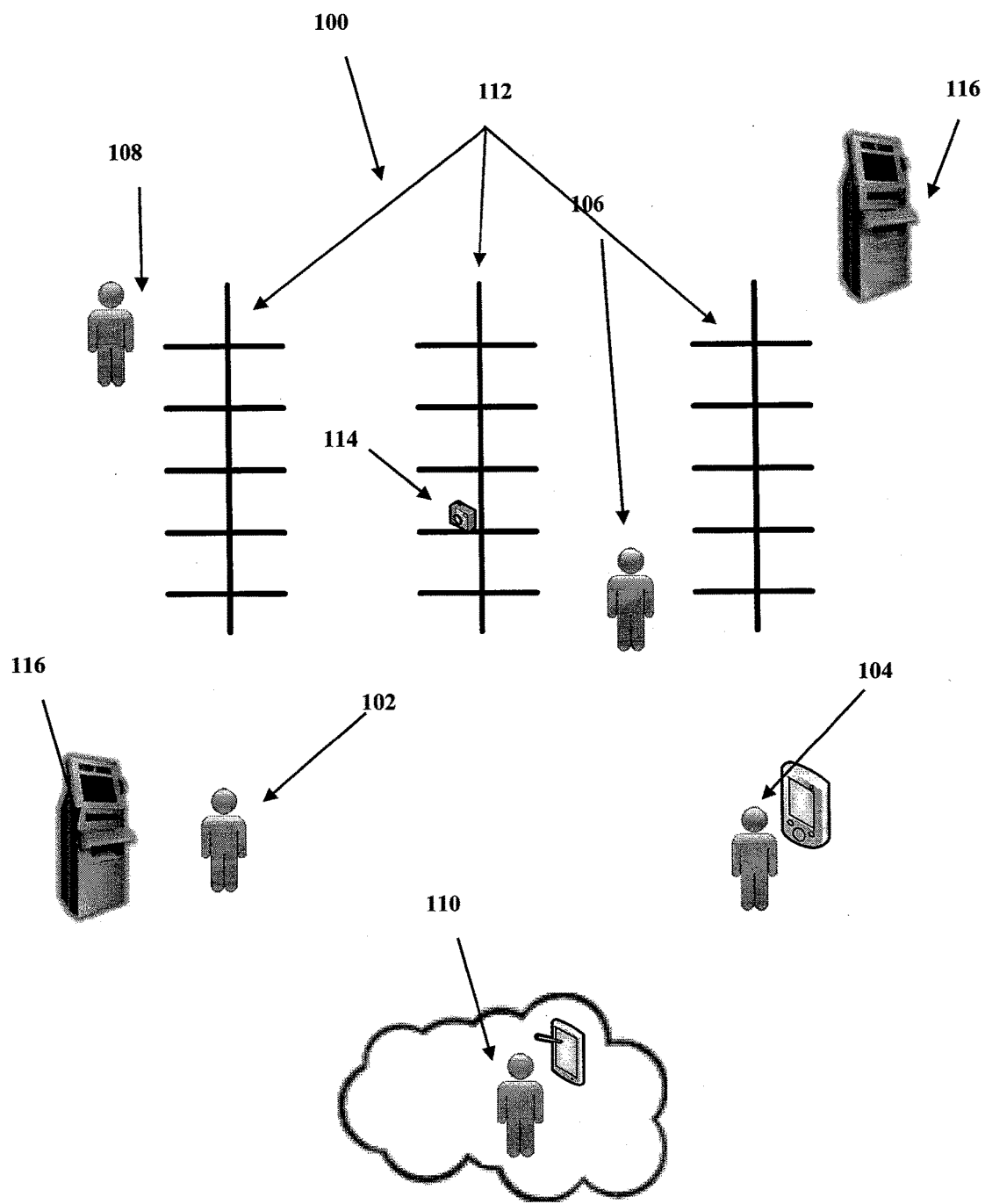
FIG. 1 shows an illustration of the system, according to an exemplary embodiment of the invention.
Figure 2:
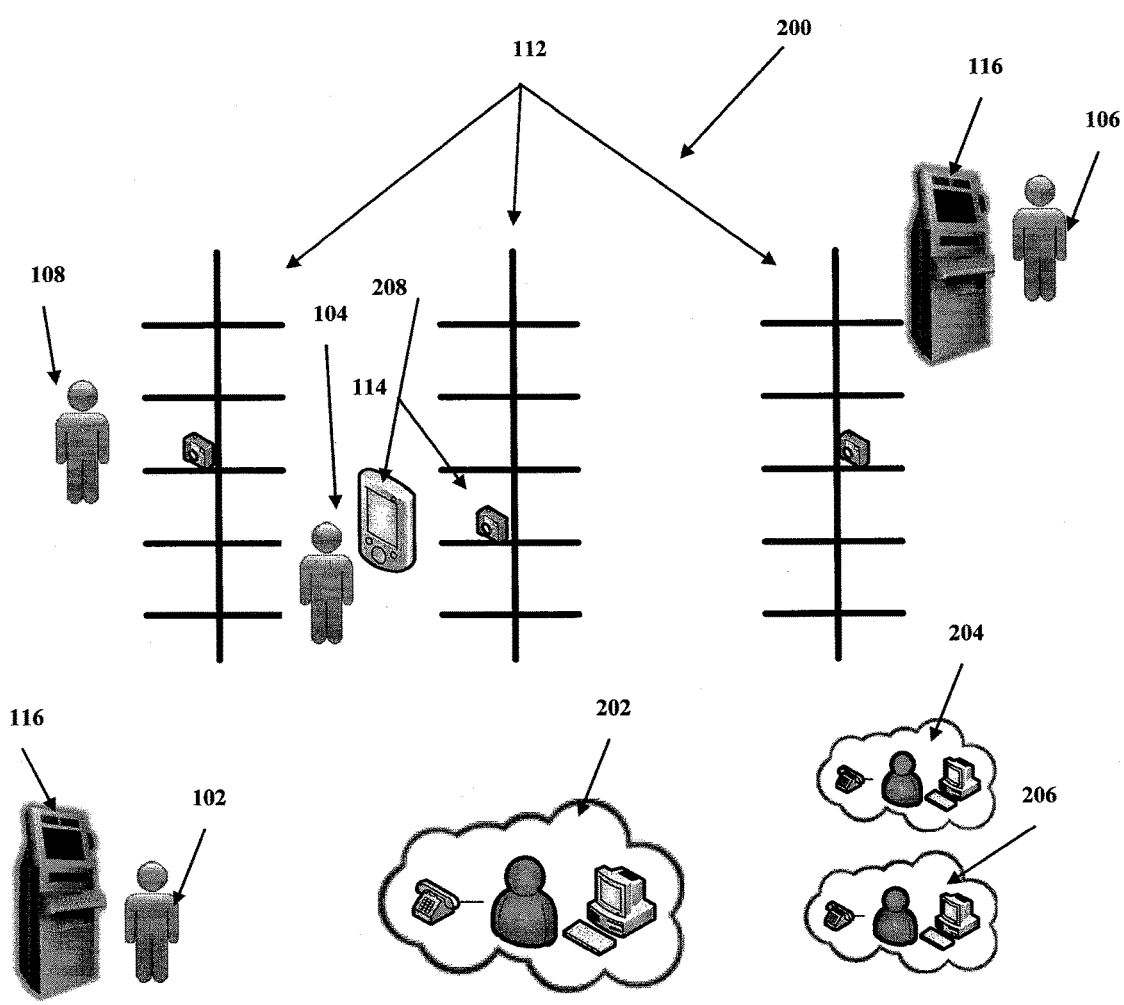
FIG. 2 shows an illustration of the system, according to an exemplary embodiment of the invention.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIG. 1 we see a typical present day store interaction 100. One or more customers 102, 104, 106, 108, 110 are interested in finding one or more items/services/products 114 within the store shelves 112. The traditional method is for the customer 102, 104 to walk around and/or ask an attendant (assuming one can be found) for the product.

More and more customers buy online 110, where they are able to use any number of computing devices (Cellphones, Tablets, Laptops, Desktops) to find/purchase items 114. With the advances in handsets, many customers 104 use the internet while at the store in their cellphones via 3G/4G cell telephony and/or WiFi. 104 Of course, in certain cases, some stores have begun implementing kiosks 116, but these mostly are either access terminals to the internet, and/or 'canned' efforts at providing some generic information. Such an example can be seen with customer 102. These would not be 'just' maps, but interactive location maps capable of representing interactive data relevant to the user or customer.

In contrast, the proposed AskMe Now system and method (according to an illustrative embodiment of the invention) 200 would allow customers to be aided in a number of ways, without the need to add significantly more store attendants. Of course some customers 108 would still be able to 'hunt' down items at their leisure.

The proposed AskMe Now system is comprised of a number of components. The first is a local interactive apparatus for use by at least one individual, said interactive apparatus having a video and/or audio component, and being connected to one or more networks capable of transmitting said local interactive apparatus audio and/or video over said network. In the above, we define local as being where the customer or similar individual is.

A second system component is a remote interactive apparatus for use by at least one Customer Service Agent (CSA) or attendant 202. Such an apparatus could be central, remote or even in the same location as the client, customer or individual. However we term it remote, in that the interaction between customer and CSA would be primarily driven through audio/video connections. In such a fashion, the connection between local and remote interactive apparatus would be driven by one or more networks capable of transmitting the audio/video signals between them. Most video transmission includes the use of Compression/Decompression (Codec) digital streams of video and/audio signals.

A principal addition to the system would be a live customer service agent (CSA) 202 (local or remotely located), to allow for the answering of any questions. As such, customers may access the system in any number of ways. Besides the aforementioned "old-style" manual searcher 108, some other customers may use one or more local interactive apparatus comprised of kiosks 116, such as customer 102 where the interaction is initiated by the customer. Other customers 104 may use mobile platforms as their local interactive component, where the local interactive apparatus takes the form of the customers Smartphone or tablet, or in addition to the customer provided platform (voice only phone, video smartphone), or these interactive components may be mobile devices such as tablets (e.g. iPads and others) provided to the customers by the store 208 when performing the search for the products.

A principal addition to the system, would be the constant communication and augmentation of a customer or individual situation, that is situational awareness of an individual for the CSA by (in addition to certain areas of the store with kiosks 116), the addition of other surveillance capabilities and methods. Such surveillance components may include; microphones, cameras, apps within the mobile platform, GPS location data, etc.

These will result in surveillance component data such as sound, motion, video, and other data from beacons, RFID tags, barcode scanners, etc.) on either the store, the user's mobile platform and other areas (preferably with the user's positive acquiescence), so that the CSA 202 interacting with said local interactive component can determine that the customer has questions, what are they, how to direct the customer to a solution most efficiently, etc. Of course, such 'surveilling or snooping' kiosks (which as the others may be mobile and/or fixed), may be equipped with 'human interaction' queues so that persons walking at/near them may be aware that their conversations may be monitored.

Such queues may include the kiosk repeating "do you need help?", "ask me any question" and/or any other queues so the humans nearby can be aware they are being observed.

Access to the CSA 202 may be accomplished via traditional voice only circuits (including line, cellular, VoIP and other forms of telephony), as well as internet (including voice/video/surveillance cameras). One of the differences, is that the CSA 202 would in addition to answer queries initiated by the customer (akin to a Concierge, Customer Service/Information Counter and/or Traditional Kiosk), be able to initiate the interaction based on video/sound and other information queues gleaned from the customer.

Figure 5:
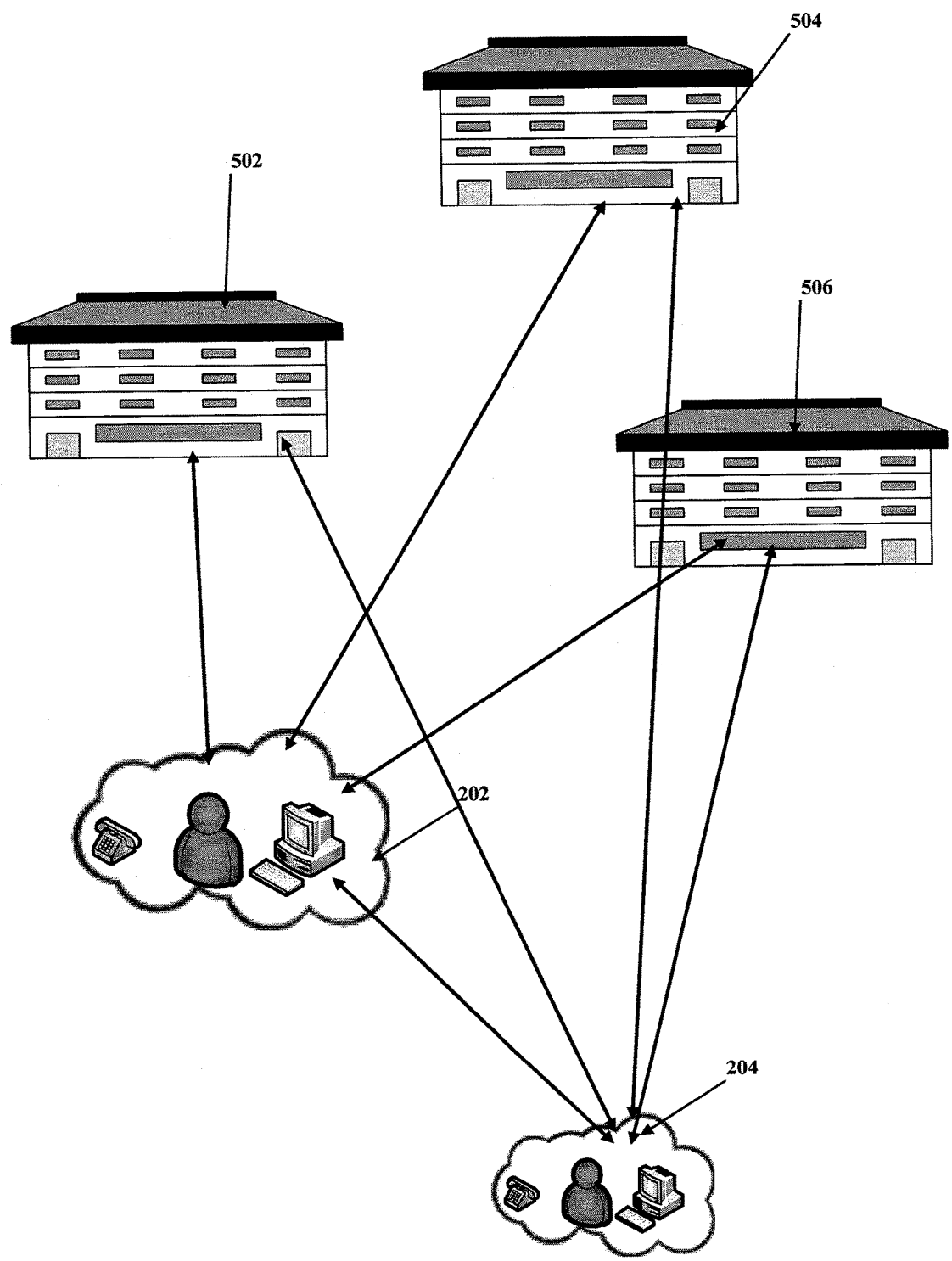
FIG. 5 shows an illustration of the system interactions within one or more CSAs and two or more stores, according to an exemplary embodiment of the invention.

In one embodiment, the AskMe Now platform would allow for interactive point to multi-point real-time, two-way video/audio communication. Such interactive points may include any of the customers interfaces (including but not limited to kiosks 116, cellphones/tablets in use by the customer 104, 110). Referring to FIG. 5, we see how in an embodiment, the communication can be initiated by the customer 102 as well as by any of the AskMe Now operators (202, 204b). The user 102 at one or more stores (502, 504, 506) may be attended by a store/brand/area specific CSA 202, 204 or transferred by either that CSA or the system automatically to one or more other CSAs 204 based on language (as well as accent within a particular language e.g. Spaniard vs. Argentinean Spanish, Beijing vs. Shanghai Mandarin Chinese), ethnicity, religion, what part/brand is the client holding (e.g. plumbing vs. HVAC), Customer Identification (via RFID tag, facial/voice and/or other biometric recognition), etc.

Note that in addition to dealing with a customer at one store 102, the CSA 202 through his/her cloud/internet connections, is capable of interacting with customers at other stores. In fact, this is a major advantage of the system, since a CSA may deal with a client at one store, but if he/she is very occupied, the system may balance the load by having the customer 102 interact with another CSA (204, 206), etc.

In effect, the system would allow the CSA 202 agent to use all possible queues to provide a much more personalized experience. In one example, imagine you show the part you are interested in, or even select the store department of interest (e.g. Plumbing) before initiating the CSA interaction. The system would then be able to connect you directly with CSA 206 avoiding unnecessary menu-selection.

In certain cases, the interaction would be initiated with you from the centralized point 202, when the connection that is providing a constant video feed to the centralize location, permits the centralized location 202 to identify that a customer has spent significant time in front of the plumbing section while looking around for help. In other cases, when there is no active communication, the remote station 116 can display a video feed that could be used as an information tool, marketing or other purposes.

In one embodiment, the AskMe Now 200 platform works by creating an audio/video connection from a centralized point 202 to any authorized station over the Internet. Remote stations are usually Smartphones or tablets with camera, microphone and speakers (standard equipment for them), Kiosks 116 (with similar technology as well as user input devices such as mice, keyboards, etc.). The centralize point 202 has a dashboard application that allows it to manage the multiple stations in real time, allowing the operator to switch back and forth from the different connections.

Many interaction protocols may be used, including MP3, Vorbis, Advanced Audio Coding (AAC) for the audio, video streams using protocols such as H.264 or VP8, which are then assembled into container bitstreams such as MP4, FLV, WebM, ASF or ISMA. These are well known by video-conferencing, tele-presence applications, what AskMe Now accomplishes is for the communication to be initiated by either party, and to be augmented with other customer queues (including but not limited to those discussed above), so that the interaction resembles a CS/Sales person asking you to initiate a transaction, rather than waiting for the customer to ask.

In addition, the communication is intended to be on a one to one basis and not a group conversation. Furthermore the stations could interact with an external system or devices, say for example a printer, adding additional flexibility to the solution. As such, the AskMe Now platform may be used for multiple purposes, including;

Interactive Marketing—considering that it can be deployed anywhere, as long as there is a WIFI connection, AskMe Now could be installed at a supermarket shelf and, from ' the centralize location', used to interactively and real time market a product on the shelf that a customer might be considering buying. With a printer it could also print coupons or recipes, etc. Questions the customer might have can be answered real time by a trained personnel.

Security—The technology could be deployed at entries where controlled access is required—a person could speak to a centralized operator and be granted access to a building/neighborhood as well as could be oriented about where an office or a house might be. Again, since it can interact with other systems it can remotely open doors or gates, as well as clear with one or more of the responsible persons if this person should be allowed in.

Mall directory—the platform could provide a real time solution to the typical store directory of malls, but with the added benefit that it is interactive and can be used as a marketing tool. In addition, under certain conditions, the item being looked for may be obtained by the store and brought to a pick-up location.

In addition the system would be able to generate reports and metrics to measure its effectiveness, as well as to manage resources within the cloud for CSA and others. In addition, the CSA may interact with internal and external resources such as printers, security systems (including human guards, etc.).

Figure 3:
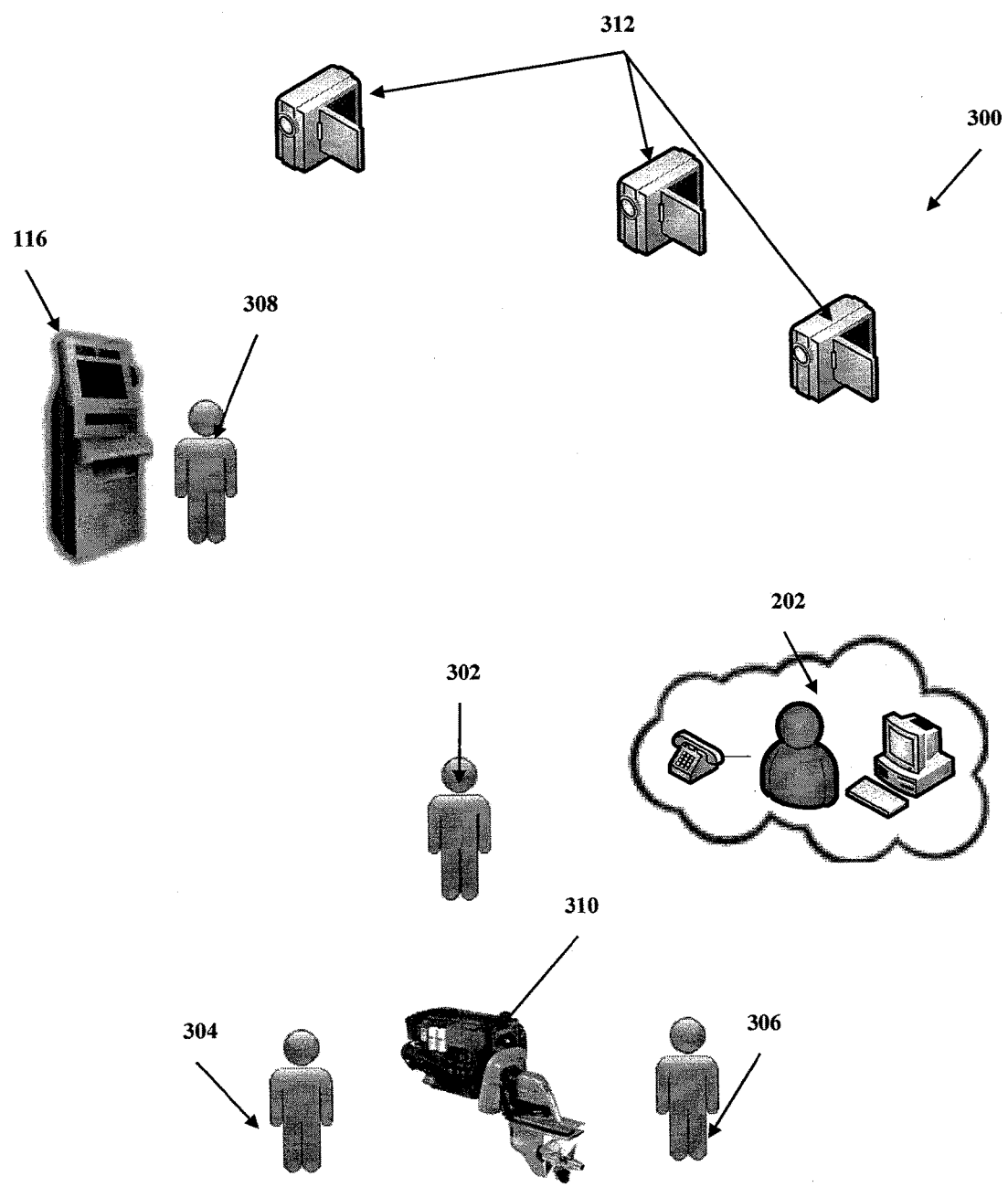
FIG. 3 shows an illustration of the system, according to an exemplary embodiment of the invention.

In another embodiment, the ability to tailor any customer interface experience can be seen referring to FIG. 3, we see an illustrative embodiment of the system 300. One or more potential customers 302, 304 may be at a tradeshow, interested in a particular piece of merchandise, and interacting with a sales rep 306 say about a boat engine 310, or the client 308 with a kiosk 116 having information and/or each other. This is the typical interaction we see at a store, or a trade show, etc. The customer surveillance means may include wide angle video cameras 312 (perhaps embedded in the ceilings, kiosk 116, floors and/or other places).

These wide angle units may be fixed and/or moveable, with their primary purpose being the establishment of potential customers within the physical space, as well as the actual identification of individuals (i.e. the lady with the six shopping bags, the lady with the poodle), but even more important the establishment of likely shoppers. In alternate embodiments, the actions may be accomplished by RFID, NFC or other beacon means to an ID badge, cell phone, etc.

Figure 4:
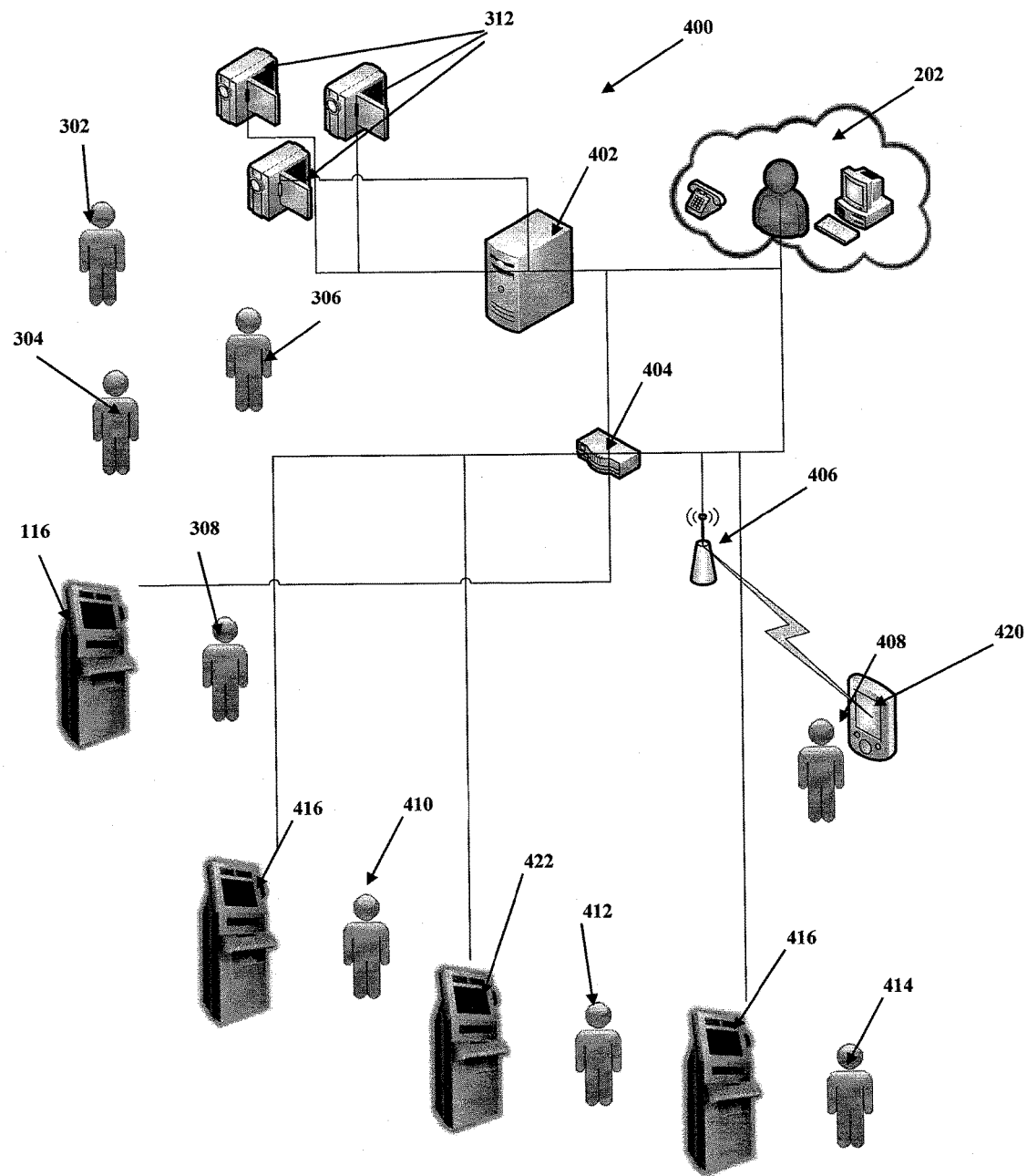
FIG. 4 shows an illustration of the system interactions within a tradeshow environment, according to an exemplary embodiment of the invention.

Referring to FIG. 4, we can illustrate specifics of the above. Imagine the tradeshow scenario 300, where the sales rep 306 must discern amongst potential customers that are split between the 'lookers' 302, 304 and the 'ready to spend' known customer. To help the sales rep 306, the customer ID/engagement sensor suite (including but not limited to wide angle and narrow/pan/zoom video systems 312, audio 108, and/or other recognition systems such as kiosks 116) is fed to the one or more CSA 202 operators in the cloud, who are engaged in the asset assignment function.

The audio/video feeds from the cameras 312 and the kiosks 116 are fed to the CSA 202 using a combination of one or more servers 402, switches 404, wired and wireless links 406, so that when a suitable prospect 308 is identified, the computing means described above (including video/audio switchers 404, servers 402, and wired/wireless links then direct the user's 308) interaction via a kiosk 116 to one or more human assets 408, 410, 412, 414 which then may use workstations 416, 422, or even portable devices 420 (tablets, smartphones, etc.) which allow the customer 308 to be directed to interact with the appropriate help/service/salespersons 404, 410, 412, 41412, who stands ready to engage.

In one embodiment, the prospect 308 is found to be a Colombian individual interested in diesel engines. The CSA 202 performing the assignment function identifies the customer 308 as a repeat customer, and assigns the Colombian region salesperson 412, comfortably ensconced in the Cartagena sales office tele-presence station 418. In this fashion, the customer 308 is met by someone he/she is comfortable with, all without the travel/dead time associated with standing at a tradeshow booth.

If the salesperson 412 feels there is further help required for the client 308, she may decide to add a diesel expert 408 who is co-located at the show but not at the booth. The CSA 202 can then add yet a third facility 420 into a 3-way (or more parties) conference call.

The customer willingness to engage may be judged in many ways. This may include calling/messaging the cell phone or App of willing/known parties 104 ("May I show you other options for this sweater?"), activating an application within their Smartphone ("May we be of assistance?"), etc. In one embodiment, the kiosks may be a help station 116 or mannequins equipped with customer engagement means (including camera, microphone and/or speakers) placed near the merchandise 114, and/or by a kiosk 116.

When the customer has acknowledged the desire to interact, similar or separate customer engagement means (kiosks 116), client's cell phone, store supplied tablet 208 may then be used to interact with the now, interested customer 102, 104. Of course, tele-presence provides a number of advantages. The customer may be greeted in their preferred language, and even met by a preferred salesperson.

Of course, while the above focuses on sales related activities, we can see these customer engagement means 312, 116 could be used for non-sales activities where there is a need to identify a potential target or focus of attention. In effect, any customer engagement business may benefit from these.

In such an embodiment, the bi-directional interaction platform described above would expand beyond perceived sales/marketing services into bi-directional audio/video surveillance, concierge, product support, location information and other monitoring of spaces that would be under surveillance/observation without the persons within such areas being aware of the surveillance.

As seen above, a critical element in such a system would be the ability to initiate and manage the customer one-on-one engagement via multiple customer engagement platforms (116, 312, 208, etc.) located within a network that ensures the engagement of the customer by the most qualified individual/group available within the network through the assignment function performed by the CSA 202 of both hardware/software and human asset and their optional ancillary linkage.

In such a system, we can see the difference of these and other advantages over a traditional one-on-one/one-on-many video-conference, where the customer initiates the engagement/query, whereas the applicant presents a system where the engagements may be initiated by the system, and where one or more factors about the customer 102/308 (language/preference/VIP status) may have already been ascertained and taken into account when connecting the appropriate asset (204, 206, 408, 410, 412, 414) with the customers 102, 104, 308.

In applications where the person's motives may be presumed (always a dangerous action), such as with a building concierge station (where the user interacts with a booth/fixed location with a certain intent), the applicant's system coupled with the remote CSA 202 recognition may lead to a positive query "going up to the 5th floor as usual Mr. Jones?" via a text message to the known party (rather than having them wait in line), or preparation to answer in Spanish for a known Spanish speaker, etc. In the applicant's case, the above may be done by the seamless connection and control of multiple network nodes within the provider network of computing means.

Another embodiment of the above would be the overall oversight of the interactions, including looking at data flows and tasking/allocating network resources to the various entities, when said entities are using their own devices for the interaction (through mobile, tablet, PC devices and applications such as Skype, Viber, Whatsapps and others).

In another embodiment, the overall advertising and other ancillary revenue generating and revenue sharing means and methods are controlled and/or coordinated by said supervisory/allocation functions entity, which ensures through its control of the customer engagement means that all customer interactions meet the customers and vendor (not necessarily those of the customer engagement company) requirements/goals and overall quality goals.

Of course, the related technology may itself lead to the birth of a business. Imagine a company that focuses on providing the customer engagement means 110 to those in the business. Such a company may provide the interaction booths, the communication links and the other portions of the system one week to a company selling boats at a boat show, ensuring the salespeople across the globe are available at their audiovisual terminals to interact with potential customers. The week after, the supply company may simply provide the links to activist that are responding to festival attendees' social media interactions, while that evening the communication resources are allocated to allow one-on-one interactions to social media and other questions to a candidate's posture.

The above would allow such a service provider to monetize the solution a number of ways, which may be applied together and/or separately. A first would be the rental of the actual customer interface means. Such would be optimal for a company serving trade shows and other itinerant events, where they customer interface means and their connection to the customer interaction agents (such as service, sales, FAQ answerers) could be managed by the service provider, as well as the balancing of the interactions and the bandwidth and other resources allocated to such interactions.

Another embodiment of the above would be the overall oversight of the interactions, including looking at data flows and tasking/allocating network resources to the various entities, when said entities are using their own devices for the interaction (through mobile, tablet, PC devices and applications such as Skype, Viber, Whatsapps and others).

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

The invention claimed is:

1. A telecommunication system for connecting a local individual with a distant individual, the system comprising:
   one or more mobile local interactive apparatus for use by at least one individual, said interactive apparatus having a live video and/or live audio component, and being connected to one or more networks capable of continuously transmitting said local interactive apparatus audio and/or video over said networks;
   one or more mobile remote interactive apparatus for use by at least one service agent, with at least one said remote interactive apparatus being connected to one or more networks, said remote interactive apparatus being capable of receiving live audio and/or video from said remote apparatus and controlling multiple said local interactive apparatus live audio and/or live video connections over said network;
   surveillance components for actively monitoring in real-time one or more individual's positions and/or actions data, said surveillance components including at least one or more surveillance video or audio sources separate from said individual's mobile apparatus, said surveillance components and data being capable of being controlled by two or more of said remote interactive apparatus; and
   wherein one or more of said service agents is capable of initiating an interaction between one or more other said service agents and one or more individuals through one or more said local interactive apparatus selected by said one or more service agents upon detecting an opportunity or need for productive interaction with said individual(s).

2. The system of claim 1 wherein:
   said local interactive apparatus components include at least one from the list comprised of: kiosk, hand held terminal and/or smartphone app.;
   said surveillance components may be augmented by an individual's position surveillance components data; and
   said local interactive apparatus are capable of continuous real-time video and/or audio codec over said network.

3. The system of claim 2 wherein;
said individual position data includes data obtained from at least one of; beacons, GPS, smartphone app reports, individual's location (situation, aspect, attitude, mood, etc) derivation from surveillance video and/or audio.

4. The system of claim 1 wherein;
said individual position data includes data obtained from at least one of; beacons, GPS, smartphone app reports, individual's location derivation from surveillance video.

5. A telecommunication method for connecting a local individual with a distant individual, the method comprising:
providing one or more a mobile local interactive apparatus for use by at least one individual, said interactive apparatus having a live video and/or live audio component, and being connected to one or more networks capable of transmitting said local interactive apparatus continuous real-time audio and/or video over said network;
enabling one or more mobile remote interactive apparatus for use by at least one service agent, with at least one said remote interactive apparatus being connected to one or more networks, said remote interactive apparatus being capable of receiving live audio and/or video from said remote apparatus and controlling multiple said local interactive apparatus live audio and/or live video connections over said network;
providing surveillance components for actively monitoring in real-time one or more individual's positions and/or actions data, said surveillance components including at least one or more surveillance video or audio sources separate from said individual's mobile apparatus, said surveillance components and data being capable of being controlled by two or more of said remote interactive apparatus; and
wherein one or more of said service agents is capable of initiating an interaction between one or more other said service agents and one or more individuals through one or more said local interactive apparatus selected by said one or more service agents upon detecting an opportunity or need for productive interaction with said individual(s).

6. The method of claim 5 wherein:
said local interactive apparatus components include at least one from the list comprised of: kiosk, hand held terminal and/or smartphone app.; and
said surveillance components may be augmented by an individual's position surveillance components data; and
said local interactive apparatus are capable of continuous real-time video and/or audio codec over said network.

7. The method of claim 6 wherein;
said individual position data includes data obtained from at least one of; beacons, GPS, smartphone app reports, individual's location derivation from surveillance video.

8. The method of claim 7 wherein;
said individual position data includes data obtained from at least one of; beacons, GPS, smartphone app reports, individual's location derivation from surveillance video.

* * * * *